United States Patent [19]

Faust et al.

[11] Patent Number: 4,798,416

[45] Date of Patent: Jan. 17, 1989

[54] SEAT, PARTICULARLY A VEHICLE SEAT

[75] Inventors: Eberhard Faust, Stuttgart; Heinz Bossert, Holzgerlingen; Kurt Niethammer, Jettingen-U; Otto Ohlhausen, Sindelfingen, all of Fed. Rep. of Germany

[73] Assignee: Daimler-Benz Aktiengesellschaft, Stuttgart, Fed. Rep. of Germany

[21] Appl. No.: 72,169

[22] Filed: Jul. 10, 1987

[30] Foreign Application Priority Data

Jul. 12, 1986 [DE] Fed. Rep. of Germany ....... 3623634

[51] Int. Cl.$^4$ ............................................. A49C 7/02
[52] U.S. Cl. .................................... 297/452; 297/218; 297/DIG. 1
[58] Field of Search ................. 297/DIG. 1, 452, 219, 297/218; 5/471, 474

[56] References Cited

U.S. PATENT DOCUMENTS

| | | | |
|---|---|---|---|
| 1,279,510 | 9/1918 | Burrows | 5/474 |
| 1,418,940 | 6/1922 | Kutschmar | 297/218 |
| 2,105,925 | 1/1938 | Marsack | 5/474 |
| 2,981,318 | 4/1961 | Lincoln | 297/DIG. 1 |
| 3,233,253 | 2/1966 | Cauvin | 297/218 |
| 3,451,075 | 6/1969 | Woodard | 297/452 |
| 3,630,572 | 12/1971 | Homier | 297/218 |
| 3,649,974 | 3/1972 | Baruth et al. | 5/474 |
| 3,675,970 | 7/1972 | Bereday | 297/452 |
| 4,624,503 | 11/1986 | Kazunori | 297/452 |
| 4,627,664 | 12/1986 | Okazaki et al. | 5/471 |

FOREIGN PATENT DOCUMENTS

| | | |
|---|---|---|
| 2519901 | 4/1976 | Fed. Rep. of Germany . |
| 2622780 | 1/1977 | Fed. Rep. of Germany . |
| 1303611 | 8/1962 | France . |
| 80511 | 4/1963 | France . |

Primary Examiner—Francis K. Zugel
Attorney, Agent, or Firm—Barnes & Thornburg

[57] ABSTRACT

In the case of a seat, particularly a vehicle seat having a supporting frame, there is provided a spring system that is fastened at said supporting frame, an upholstered part that rests on said spring system, and a cover that covers said upholstered part, and for achieving a shaping tension of the upholstery, is braced in its border area in the direction of the supporting frame. The cover, in order to achieve a soft surface, is fixed a first time in the transition area from the upholstered part to the spring system, in which case this area receives a bearing capacity created by stiffening means, such as the surrounding frame, the seat shell or the dimensionally stable upholstery material, said bearing capacity being capable of absorbing the preloading forces introduced via the lower cover portion, without repercussion on the area of the upholstered part that is on the side of the seat surface.

28 Claims, 7 Drawing Sheets

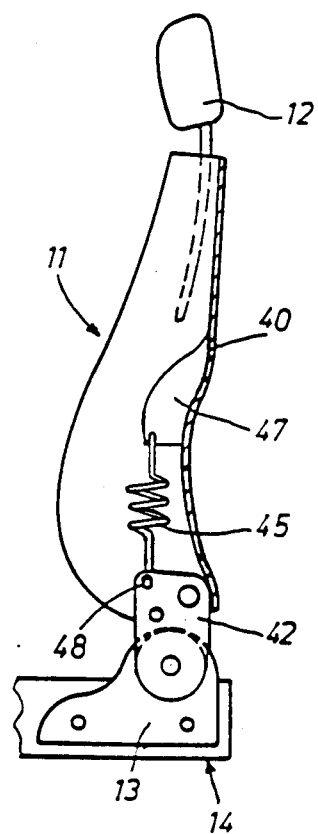
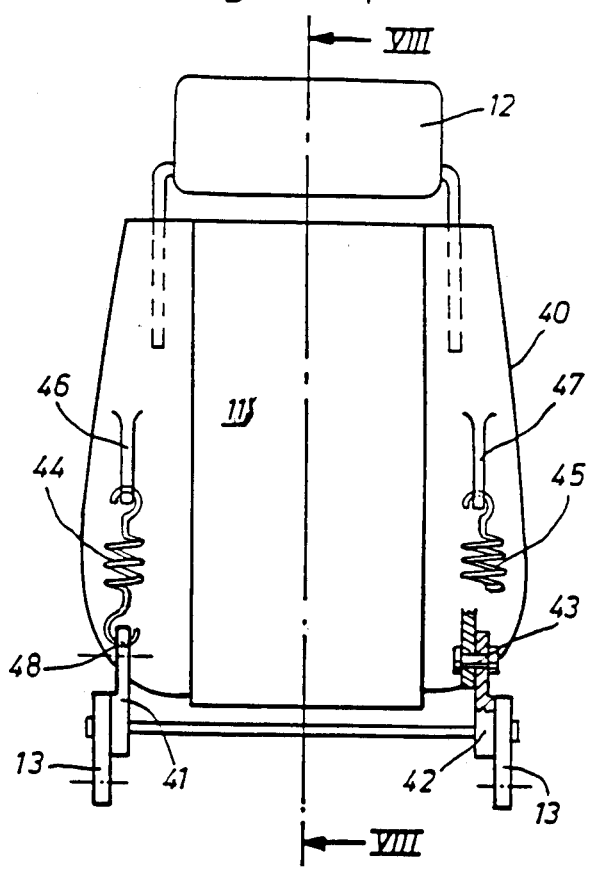
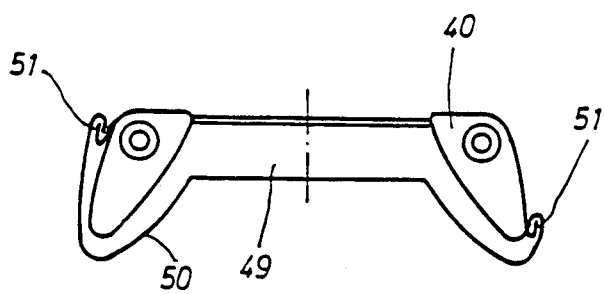

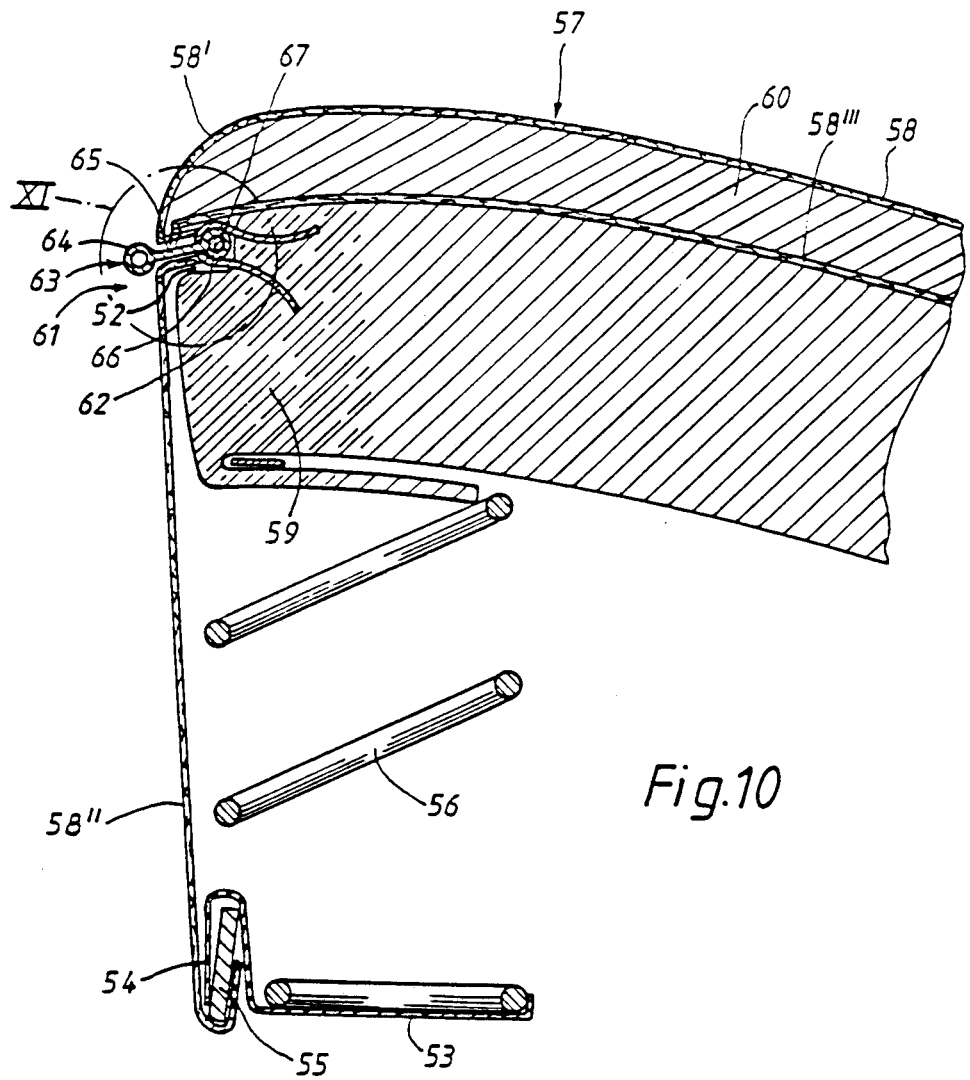

SEAT, PARTICULARLY A VEHICLE SEAT

BACKGROUND AND SUMMARY OF THE INVENTION

The invention relates to a seat, particularly a vehicle seat, of the type having a supporting frame, a spring system fastened at the supporting frame, an upholstered part arranged above the spring system and a spring preload In the case of a known vehicle seat of this type (DE-OS No. 25 19 901), the borders of the seat cushion cover, for the bracing of the upholstery with the supporting frame or with the spring system, are hung or clamped into a molded-on surrounding U-section at the supporting frame. In order to prevent folds in the seat surface and particularly in the side borders of the cover that are frequently made of other materials, such as imitation leather or the like, the side borders are provided with a certain prestressing and as a result are utilized for providing a certain prestressing to the spring system and a desired contour to the upholstery By means of this tension of the upholstery, a surface hardness is created on the whole seat upholstery which may be desirable in the area of the main body supports, but is found to be uncomfortable in other areas, particularly in the area of the thighs and of the hollows of the knees.

The invention is based on the objective of improving a seat of the initially mentioned type in such a way that it is possible to achieve locally differing hardnesses on the top surface of the upholstery Thus, in certain zones, an increased stiffness is to be created for a better support of the body and in other zones, a soft surface is to be provided for comfortable sitting For example, the edges of the upholstery, during the entering of the motor vehicle, should yield in downward direction (seat cushion) and toward the rear (backrest), but when turns are driven, should provide good lateral guidance without any lateral "swimming".

In the case of a seat of the type mentioned above, this objective is achieved by providing separate fastenin of the cover portion which prestresses the spring system at the supporting frame and of the cover portion at the upholstered part.

By means of the bracing of the cover according to the invention, the upholstery is relieved from pressure by the prestressing of the spring system in the transition area from the upholstery to the spring system. The hardness and the softness of the upholstery can.be selected to differ locally and irrespective of the requirements of the spring system according to work-physiological aspects and sitting comfort.

The development of the seat according to the invention, in this case, may concern the seat cushion as well as the backrest of the seat. In the former case, the supporting frame is connected with a base frame that has guide rails for the fastening in the motor vehicle, or itself forms the supporting frame. In the second case, the supporting frame is fastened at the base frame and projects away from it approximately vertically upwards, in which case the slope of the supporting frame is usually maintained so that it can be adjusted with respect to the base frame.

An advantageous preferred embodiment of the invention includes a weatherstrip or insertion strip connected by sewing to one of the upholstered part and the spring covering part, this strip being also fastened to the other part. A weatherstrip or insertion strip of this type, in addition to being used for the connection of the upper and the lower portion of the cover, while fixing the cover in the additional fastening means located above the supporting frame, is also used for the reinforcement and optical improvement of the connection. By means of the additional fastening of the cover by means of the strip, it is ensured that, on the one hand, the strip is not pulled downward by the prestressing of the spring system that is introduced into the lower portion of the cover after the cover is hung in at the supporting frame with a resultant irregular and unesthetic course of the strip. On the other hand, the prestressing in the lower portion of the cover is not imparted to the seat surface area of the cover which leads to the desired soft surface of the upholstery.

Other objects, advantages and novel features of the present invention will become apparent from the following detailed description of the invention when considered in conjunction with the accompanying drawings.

Figure 1:
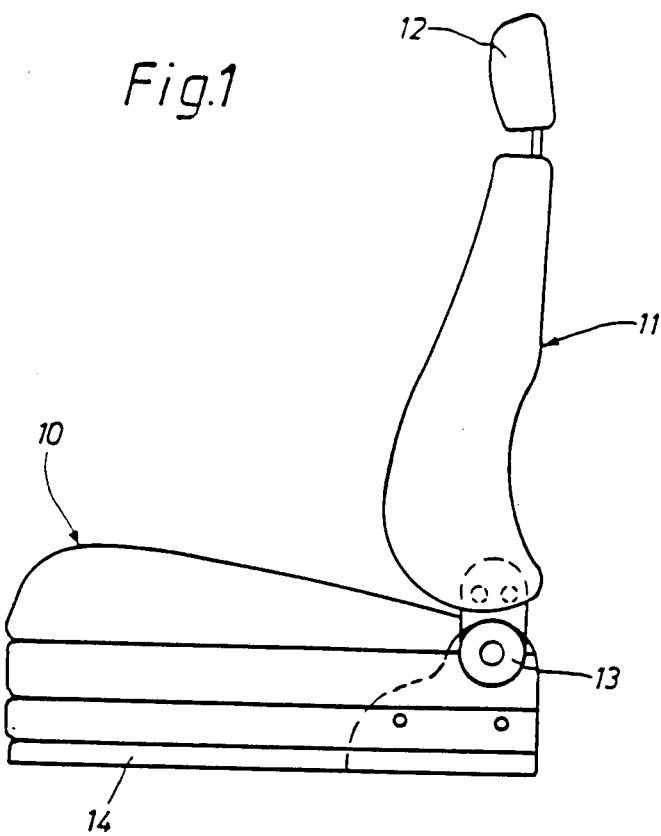
FIG. 1 is a diagrammatic lateral view of a vehicle seat comprising a seat cushion and a backrest constructed in accordanc a preferred embodiment of the invention.
Figure 3:
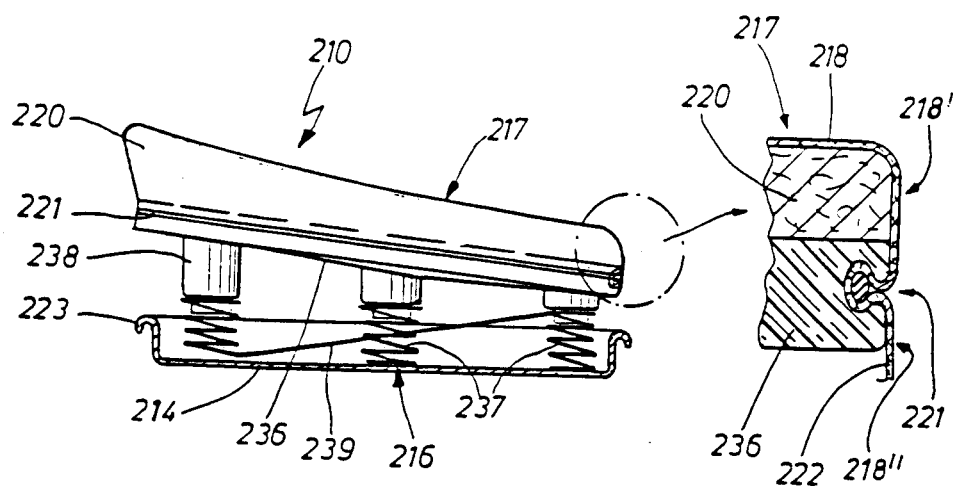
Figure 4:
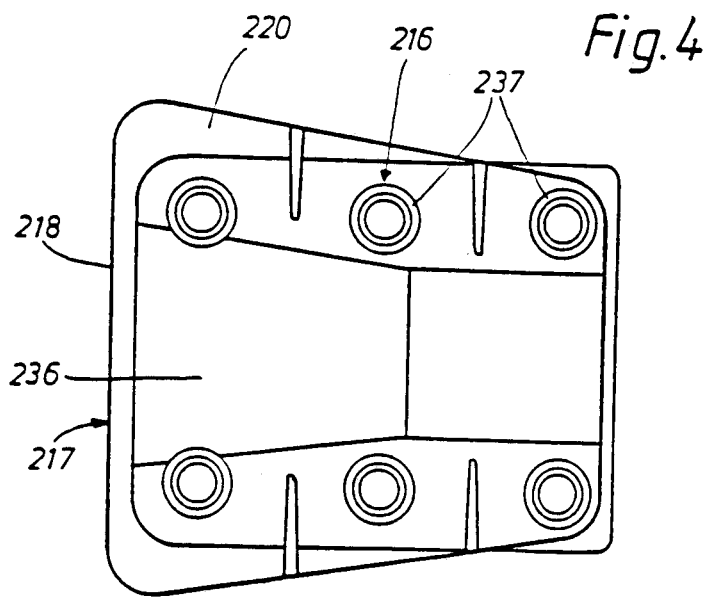
Figure 5:
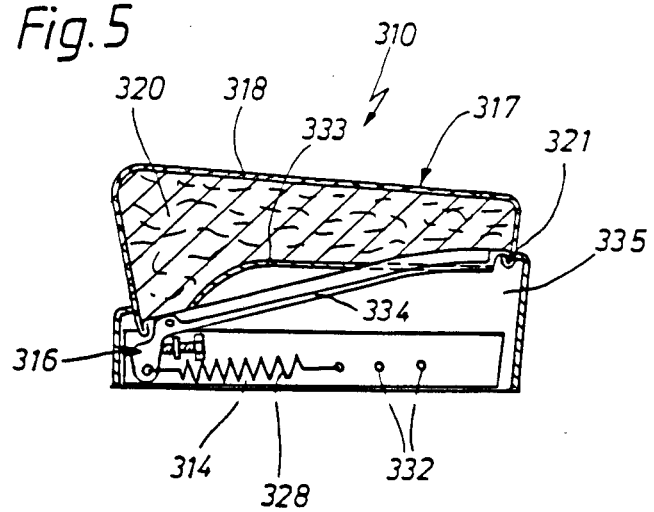
Figure 6:
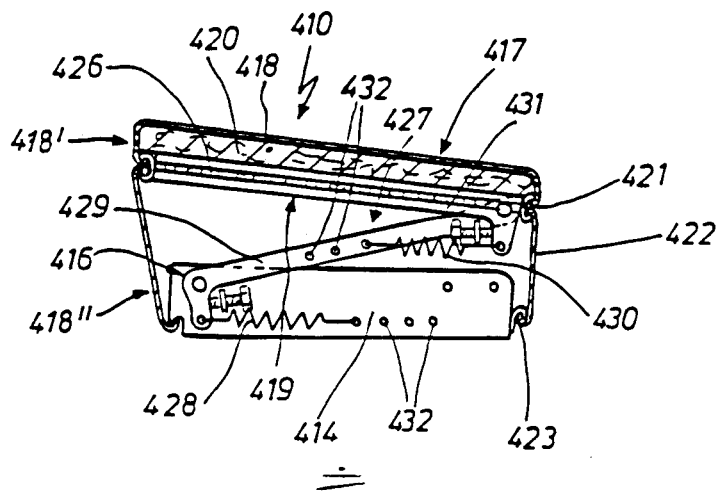
Figure 12:
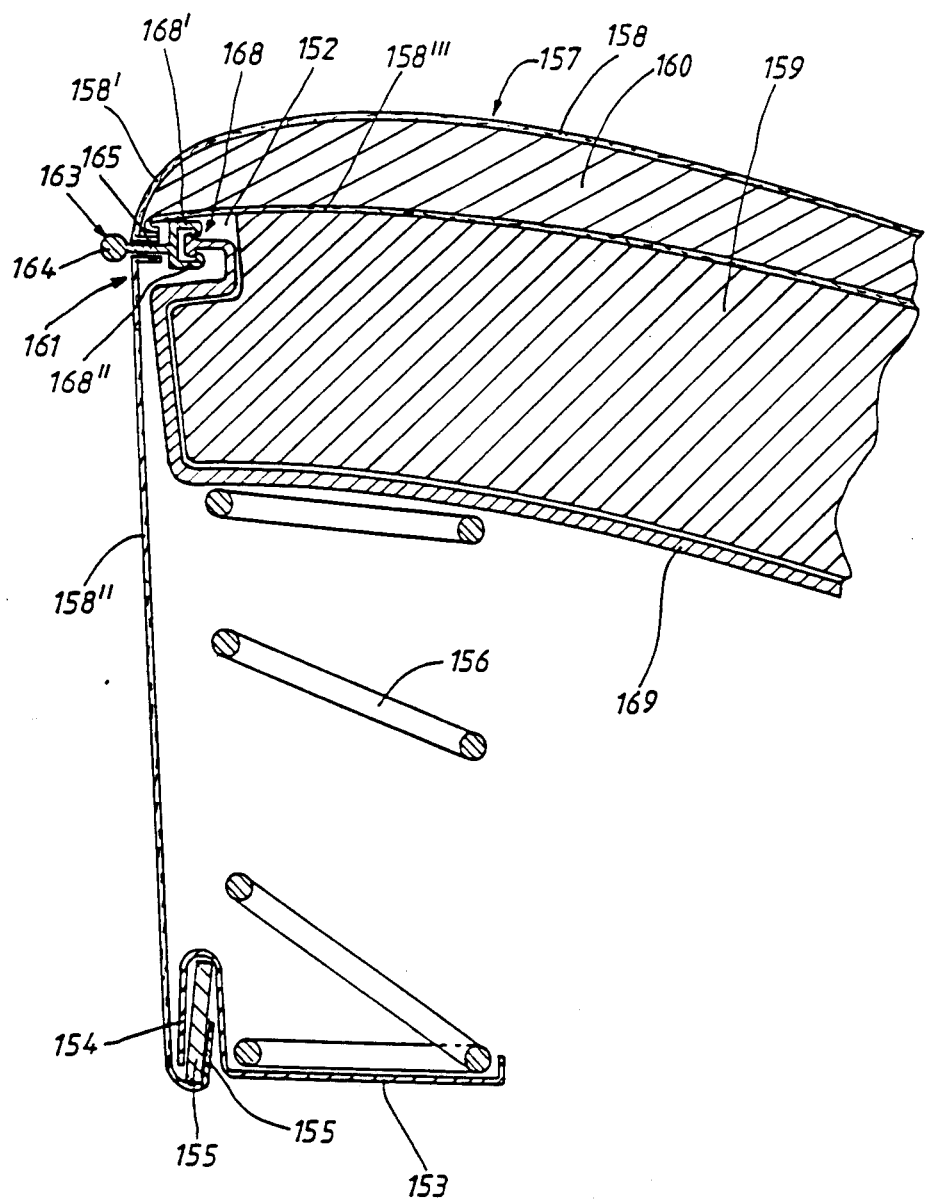
Figure 13:
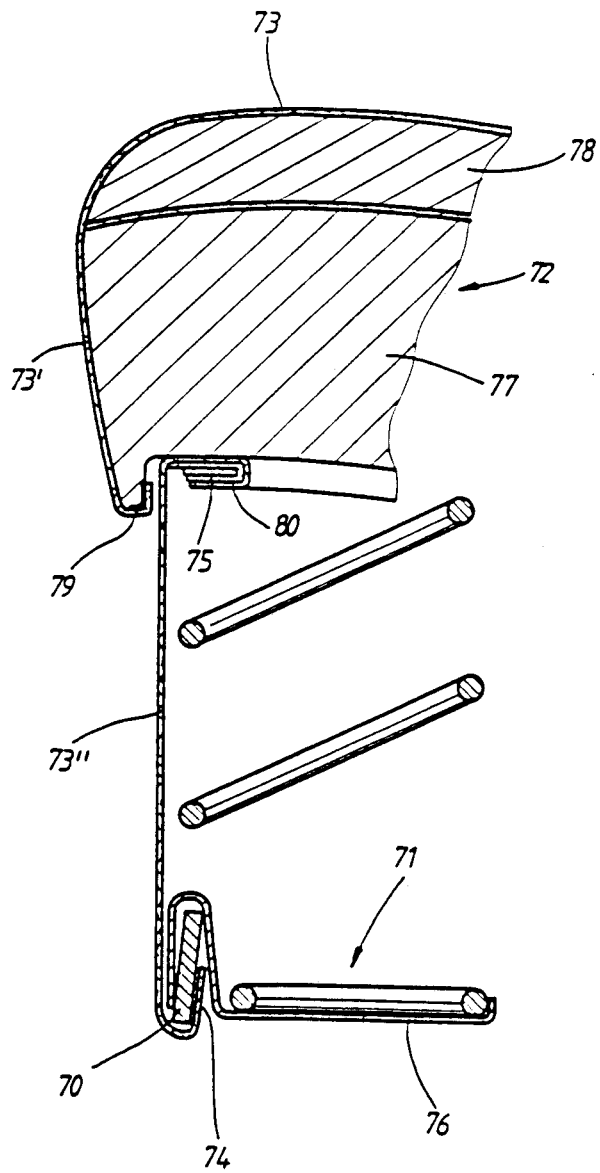

FIG. is a diagrammatic cross-sectional view of the seat cushion in FIG. 1;

FIG. 3 is a diagrammatic lateral view of a seat cushion according to a second embodiment;

FIG. 4 is a diagrammatic bottom view of the seat cushion in FIG. 3 without the supporting frame;

FIGS. 5 and 6 are respective diagrammatic lateral views of seat cushions according to a third and a fourth embodiment;

FIG. 7 a diagrammatic front view of the backrest of the vehicle seat of FIG. 1 without the upholstered layer;

FIG. 8 is a diagrammatic sectional view along Line VIII—VIII in FIG. 7;

FIG. 9 is a diagrammatic view of the backrest taken in the direction of the Arrow IX in FIG. 7 without the neckrest and with the upholstery layer in place;

FIG. 10 a diagrammatic view of a cutout of a seat cushion according to a fifth embodiment;

FIG. 11 a diagrammatic view of a cutout XI of the seat cushion in FIG. 10 with a modified fastening of the cover; and FIGS. 12 and 13 are respective diagrammatic views of cutouts of a seat cushion according to a sixth and seventh embodiment.

DETAILED DESCRIPTION OF THE DRAWINGS

Figure 2:
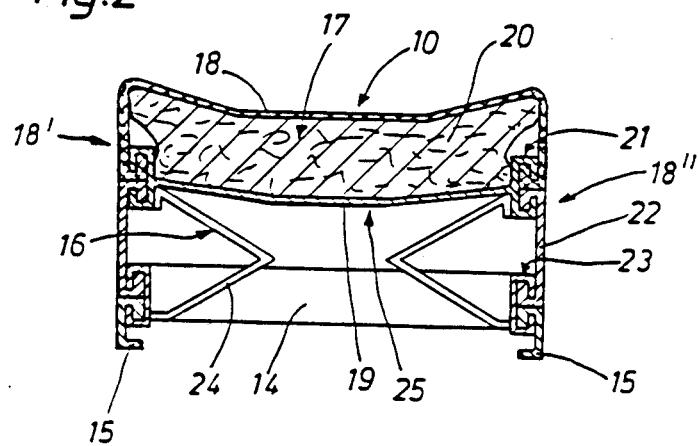

The vehicle seat shown in FIG. 1, in a known way, has a seat cushion 10 and a backrest 11 that projects vertically away from it and has an integrated headrest 12. Via laterally arranged swivel fittings 13, the backrest 11 is connected with a base frame carrying guide rails that can be pushed into guides at the vehicle. Normally, the base frame is formed by a supporting frame 14 pertaining to the seat cushion 10, the supporting frame 14 being developed as an upper part of a rail in the area of the floor,. In FIG. 2, the rails on the vehicle side, in which the supporting frame 14 is guided, have the reference number 15.

The seat cushion 10 that is shown in cross-sectional view in FIG. 2 has a spring system 16 that is fastened to it above the supporting frame 14. An upholstered part 17 rests on the spring system 16 and a cover 18 that covers the upholstered part 17 and is braced in its border area in order to obtain an upholstery-shaping tension. The seat cushions shown in the other embodiments according to FIG. 3 to 6 are constructed in the same way as the seat cushion 10 in FIG. 2 so that identical components have identical reference numbers, that for the purpose of differentiation differ in each case by 100. However, in principle, the described general construction is also used in the case of the backrest 11 that is shown in detail in FIGS. 7 to 9. The seat cushions shown in FIGS. 10 and 11 also have this basic structure.

In the case of the seat cushion according to FIG. 2, the upholstered part 17 comprises an upholstery frame 19 and an upholstery layer 20 supporting itself on it. The upholstery frame 19 is firmly connected with the spring system 16 and carries a surrounding clamping channel profile 21 in which the borders of the cover 18 are fastened The clamping channel profile 21 in its cross-section has a C-shape or a double-U shape, in which case the opening of the upper U-section points downward and that of the lower U-section points upward. The upper U-profile is used for the clamping of the cover 18 by means of corresponding fastening elements, while the lower U-profile is provided for the clamping of a flexible side covering or side screen or skirt 22 made of fabric or imitation leather that, with its lower border, is clamped into a second, identically developed clamping channel profile 23 that also extends all around at the supporting frame 14 and absorbs the preloading force of the spring system 16. The fastening of the borders of the cover 18 and the side screen 22 may take place either by means of sewn-on clamping hooks or in the manner that is described in DE-OS No. 21 10 382 or in DE-AS No. 26 58 591. The side screen 22 may also be developed in one piece with the cover 18 according to certain preferred embodiments. In both cases, the cover, above its fastening at the supporting frame 14 that is formed by the clamping channel profile 23 is also fastened by an additional fastening by means of the clamping channel profile 21 in the transition area of the upholstered part to the spring system 16 so that a separate upper portion 18' of the cover 18 is created. The preloading or prestressing forces introduced by the spring system 16 into the lower portion 18" of the cover 18 that is formed by the side screen 22 are absorbed by the upholstery frame 19 without repercussion on the area of the upholstered part 17 on the side of the seat surface.

In FIG. 2, the spring system 16 is developed as a profiled-wire spring core 24 with an upper frame 25 that is spring-cushioned at the supporting frame 14. The upper frame 25 itself forms the upholstery frame 19 at which the upholstery layer 20 is fastened by the bracing of the cover 18 in the clamping channel profile 21 so that the upholstered part 17 supports itself directly at the profiled-wire spring core. The clamping channel profile 21 is advantageously molded integrally onto the upholstery frame 19 or the upper frame 25 of the profiled-wire spring core In the same way, the second clamping channel profile 23 for the side screen 22 is also developed integrally in the supporting frame 14.

Also in the case of the seat cushion according to FIG. 6, the upholstered part 417 consists of an upholstery frame 419 and an upholstery layer 420. By means of a flat spring means 426 the upholstery layer 420 is fixed in the upholstery frame 419 that, in turn, preferably integrally carries a surrounding clamping channel profile 421, the cross-section of which has a C-shape or a double-U-shape. In the upper U-profile, the cover 418 is clampingly engaged, whereas in the lower U-profile the upper side borders-of a separate side screen 422 or of a side screen 422 that is in one piece with the cover are clampingly engaged The lower borders of the side screen 422 are fastened in the second clamping channel profile 423 that is integrally molded onto the supporting frame 414. As a result, the cover 418 is in turn fastened in the transition area from the upholstered part 417 to the spring system 416, and the lower portion 418" of the cover 418 that is braced at the supporting frame 414 absorbs the preloading forces of the spring system 416 without any repercussion on the area of the upholstered part 417 on the side of the seat surface.

In FIG. 6, the spring ystem 416 is developed as a double rocker system 427 having an intermediate frame 429 that rocks at the supporting frame 414 against at least one support spring 428 and having an upper frame 431 that swings at the intermediate frame 429 against at least one additional support spring 430. In this case also, the upper frame 431, at the same time, forms the upholstery frame 419 so that a direct fastening exists of the upholstered part 417 at the double rocker frame 427. The upper frame 431 and the intermediate frame 429 are develoPed as two-armed levers, of which the upper frame 431 is coupled at the intermediate frame 429 and the latter is coupled at the supporting frame 414. The support springs 428 and 430 ae developed as tension springs that, on one side, in each case, act upon a bent short leg of the intermediate frame 429 or the upper frame 431 and, on the other side, upon the supporting frame 414 or the intermediate frame 429. For an adjustment of the preloading of the springs, several engagement holes 432 for the tension springs 428, 430 are provided at the supporting frame 414 and at the intermediate frame 429.

In the embodiment according to FIG. 5, the seat cushion has a molded shell 333 and an upholstery layer 320 that is fastened at the molded shell 333. The sPring system 316, in this case, is developed as a swinging or rocking frame 334 that swings at the supporting frame 314 against at least one support spring 328. The swing frame again represents a two-armed lever that is disposed at a swivel shaft so that it can be pivoted at the supporting frame 314. The molded shell 333 is fastened between the two long legs of the respective pair of two armed levers The two short legs of the levers are acted upon by one each of the support springs 328 that in this case are developed as tension springs, with only the left tension spring 328 being shown here in the drawing For the adjustment of the preloading of the tension springs, several engagement holes 332 are in turn provided at the supporting frame 314. The swinging frame 334 in this case also has a surrounding clamping channel profile 321 that in cross-sectional view has a U-profile and in which the borders of the cover 318 are clamped in the same way as described in regard to FIG. 2. By means of the bracing of the cover 318 at the swinging frame 334, the upholstery layer 320 is at the same time fastened at the molded shell 333. The spring system 316 in this case is covered by means of stationary stiff side covers that on both sides are fastened at the supporting frame 314 FIG. 5 only shows the side covering 335 that is on the right in driving direction.

In the case of the seat cushion shown in lateral view in FIG. 3 and in bottom view in FIG. 4, the seat cushion consists of a self-supporting molded shell 236 and of an upholstery layer 220. The flanks of the molded shell 236—as shown in the enlarged representation in FIG. 3 on the right—carry a surrounding clamping channel profile 221 in which the borders of the cover 218 are fastened that, as a result, at the same time, braces the upholstery layer 220 on the molded shell 236. The clamping channel profile 221 that is molded integrally into the molded shell 236 is again formed in its cross-section in a C-shape or a double-U-shape. The upper U-profile is used for the interengagement clamping and fastening of the cover 218, while the lower U-profile again is used for the fastening of a flexible side screen 222 that, with its lower border, is fastened in an additional clamping channel profile 223 that is U-shaped in its cross-section and that is integrally connected with the supporting frame 214. The side screen 222 that may also be integral with the cover 218 is visible only in the enlarged representation of the cutout in FIG. 3 and, as the lower portion 218" of the cover 218, absorbs the preloading of the spring system 216

The spring system 216 of the seat cushion 210 is developed as a coil spring core 237 consisting of six coil springs (FIG. 4) that are fastened at the supporting frame 214 so that they project away from it at approximately a right angle The molded shell 236, by means of molded-on support cylinders 238, engages with the free end of the coil springs and is firmly connected with them. For the stabilization of the seat cushion 210 against longitudinal shifting, a floating strut 239 is in a known way provided in the coil spring core 237

The backrest 11 that is shown in detail in FIG. 9 in principle is constructed in the same way as the above-described seat cushion. The backrest 11 also has a supporting frame that, in this case, is developed as a self-supporting molded shell 40 The spring system of the backrest 11 is developed as a swinging frame, in which case the swinging frame is formed by the molded shell 40 itself. For this purpose, the molded shell is arranged so that it can be pivoted around a shaft 43 at two holding flanges 41, 42. The two holding flanges 41, 42 are adjustably fastened at the swivel fittings 13 of the supporting frame 14. Two tension springs 44, 45, on one side, act upon brackets 46, 47 that are molded laterally out of the molded shell 40, and on the other side, are engaged into engageable holes 48 in the holding brackets 41 and 42. The brackets 46, 47 are arranged approximately in the central area of the molded shell 40, while the pivotal shaft 43 is located in the lower area of the molded shell 40 As a result, a relatively inflexible support is obtained in the lumbar region and a higher elasticity is obtained in the sholder region that feels comfortable. The molded shell 40 is covered by means of an upholstery layer 49 that by means of a cover 50 is clamped to the molded shell 40.

For this purpose, the molded shell 40 has a molded-in or molded-on clamping channel profile 52 that in its cross-section is approximately U-shaped As in the case of the described seat cushion, the borders of the cover 50 are clamped into the clamping channel profile 51 and are appropriately fastened there By means of the corresponding clamping of the cover 50, the shape and the softness of the upholstery layer 49 can be adapted regionally to desired requirements The clamping channel profile 51 may either be arranged in a surrounding manner at the rear side of the molded shell 40, or it may—as shown in FIG. 9—be molded onto the side flanks of the molded shell 40 either close to the rear side (FIG. 9, left half) or close to the front side (FIG. 9, right half).

The seat cushion that is shown as a cutout in FIG. 10 also has a supporting frame 54, a spring system 56 that is fastened at it, an upholstered part 57 that rests on the spring system 56, and a cover 58 that covers the 57, which cover 58 is clamped by means of a clamping strip 55 to the carrying frame 54. The spring 56, on one side, supports itself at the bottom side of the upholstered part 57 and, on the other side, at a floor shell 53 that is connected with the supporting frame 54. The upholstered part 57 has a cushion layer 59 that is dimensionally stable at least on the side of the border, and a cover stuffing 60 that is located above it. Above its fastening, the cover 58 is fixed at the supporting frame 54 by means of an additional fastening 61 in the transition area from the upholstery to the spring system, so that an upper portion 58' of the cover 58 is created. In FIG. 10 this fastening 61 is formed by clamps 62 that are stapled along the edge of the cushion layer 59 into the latter However; instead of clamps, adhesive strips, Velco-strips, snap connections or the like may also be used according to other contemplated embodiments. The cushion layer 59 that is largely dimensionally stable at least in the border area, because of the fastening 61, absorbs the preloading forces of the spring system 56 introduced via the lower portion 58" of the cover 58 extending downward in the direction of the supporting frame 54, without repercussions on the area of the upholstered part on the side of the seat surface so that the upholstered part 57 and the cover 58 remain on the seat surface relatively without tension.

Along the separating or connecting point of the upper and the lower portion 58' and 58" of the cover 58, a surrounding insertion strip or weather strip 63 is sewn onto the cover and by means of fastening 61 is fixed directly along its line of contact at the upholstered part 57. The strip 63 that is made of plastic as an extruded profile has a strip head 64 that is approximately circular in its cross-section and a web-shaped strip web 65 that connects to it in one piece, onto which the two portions 58' and 58" of the cover 58 are sewn as well an additional portion 58" of the cover 58 that extends between the cushion layer 59 and the cover stuffing 60. For the fastening of the strip 63, along the end of the strip web that faces away from the strip head 64, a wire or a plastic string 66 is held at the strip, the clamps 62 are fitted through the strip web 65 in axial direction of the strip 63 at a distance from one another, and after a reaching-around the plastic string 66 are shot into the cushion layer 59. For the fastening of the plastic string 66 at the strip web 65, the strip 63 is developed as a double eye profile with a web located in between, in which case the one eye forms the strip head 64 and the other eye 67 receives the plastic string 66. The two eyes 64, 67 are connected with one another by means of the strip web 65. The clamps 62 are shot through the web and reach around the eye 67.

In FIG. 11, as a cutout, another embodiment of a seat cushion is shown in cross-sectional view, in which, in comparison to the above-described seat cushion, only the fastening 61 of the cover 58 in the upholstered part 57 is modified. Identical components therefore have the same reference numbers The strip 63 is again produced as an extruded profile made of plastic and has the strip head 64 that is approximately circular in its cross-section and the web portion 65 that connects to it in one piece. The free end of the strip web 65, in one piece, carries one half 68' of a snap connection 68, the other half 68" of which is fastened in the cushion layer 59.

However, instead of a snap connection, the free end of the strip web 65 may also be developed as a zipper profile, the counterpart of which is fastened in the cushion layer 59. The fastening of the strip 63 at the upholstered part 57 takes place by the fitting-together of the two profile parts using a zipper closing device It should be noted that a recess 52 is provided in the cushion layer 59 in which the strip 63 with the eye 67 and the snap connection 68 or the zipper closing profile is located so that only the strip head 64 projects at the upholstery border.

In FIG. 12 another embodiment of a seat cushion is shown as a cutout in cross-sectional view. The seat cushion corresponds largely to the seat cushion shown in FIG. 10 so that the same components have identical reference numbers which, however, for purposes of differentiation, are increased by 100. One difference is the construction of the upholstered part 157 arranged above the spring system 156 that, in addition to the cushion layer 159 and the foamed-material layer 160, also has a plastic molded shell 169 that reaches around the cushion layer 159 up to close to the foamed-material layer 160. The fastening 161 of the cover 158 in the transition area of portions 158' and 158" no longer takes place at the cushion layer 59, but at the border of the shaped shell 169. The connection of portions 158', 158" and 158''' of the cover 158 also takes place by means of a strip 163 that is fastened at the upper border of the molded shell 169. The strip 163 is constructed in the same way as in FIG. 11 as an extruded profile channel member made of plastic, in which case strip web 165 that in one piece is connected with the strip head 164 integrally carries one piece 168' of a snap connection 168. The other part 168" of the snap connection 168 is shaped integrally onto the edge of the molded shell 169. Instead of the snap connection 168, a zipper closure-type connection may again be provided between the strip 163 and the edge of the molded shell Here also, the strip 163 with its strip beard 165, the snap connection 168 and the edge of the plastic molded shell 169 are located in a recess 152 of the cushion layer 159 so that only the strip head 164 projects beyond the border of the upholstered part 157.

The seat cushion according to another embodiment that is shown as a cutout in FIG. 13 also has a supporting frame 70, a spring system 71 that is fastened at it, an upholstered part 72 that rests on the spring system 71 and a cover 73 that covers the upholstered part 72. The cover 73 is braced by means of a clamping channel strip 74 at the supporting frame 70. The spring system 71, on one side, supports itself with an upper frame 75 at the bottom side of the upholstered part 72 and, on the other side, at a floor shell 76 that is connected with the supporting frame 70. The upholstered part 72 has a cushion layer that, at least on the side of the border, is dimensionally stable and is made of rubberized hair and has a cover stuffing above it The cover 73 is fastened again above its fastening at the supporting frame 54 in the transition area from the upholstered part 72 to the spring system 71. In this case, in the area of this additional fastening, the cover 73 is divided so that an upper portion 73' and a lower portion 73" of the cover 73 is created. The fastening of the two portions 73' and 73" is carried out separately. In this case, the upper portion 73' is fastened on the bottom side of the cushion layer by means of an adhesive strip 79, while the lower portion 73" is hung in at the upper frame 75 of the spring system 71 by means of a sewn-on clamping channel profile 80.

As a result, the preloading forces of the spring system 71 that are introduced via the lower portion 73" of the cover 73 are absorbed by the upper frame 75 of the spring system 71 without any repercussion on the area of the upholstered part 72 that is on the side of the seat surface so that the upholstered part 72 and the cover 73 remain on the seat surface relatively without tension. The fastening of the upper portion 73' at the cushion layer may also take place by means of clamps, Velco-strips or the like. The cushion layer 77 rests directly on the upper frame 75 of the spring system 71 and is clipped to it.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A seat, particularly a vehicle seat, having a supporting frame; a spring system that is fastened at the supporting frame; an upholstered part having side edges and a dimensionally stable upholstery means arranged above the spring system; a cover means having an upper portion covering the upholstered part; said cover means having a lower portion fsatened with a first fastening means at said supporting frame, wherein it is tensioned at a border of the supporting frame for producing a spring preloading on the seat; the cover means having an additional fastening means located above its first fastening means for fastening the upper portion of the cover means to the dimensionally stable upholstery means at a transition area between the upholstered part and the spring system to thereby define a junction of said upper and lower portions of the cover means; and wherein the cover means in the transition area between the upholstered part and the spring system defines a preload force absorbing means for absorbing said spring preloading without allowing the force due to the spring loading to be applied to the upper portion of the cover means that surrounds said side edges of the upholstered part.

2. A seat according to claim 1, wherein the upholstered part also has an upholstery layer that supports itself at the upholstery frame means; the preload force absorbing cover means acting through the dimensionally stable upholstery means; the dimensionally stable upholstery means carries a surrounding clamping channel profile that forms the additional fastening means for the cover in which borders of the cover.are fastened; and wherein the dimensionally stable upholstery means is connected with the spring system.

3. A seat according to claim 2, wherein the dimensionally stable upholstery means is an upholstery frame means that forms a part of the spring system itself.

4. A seat according to claim 2, wherein the clamping channel profile is molded integrally at the dimensionally stable upholstery means.

5. A seat according to claim 2, wherein the spring system is developed as a profiled-wire spring core with an upper frame that is spring-cushioned on the supporting frame, and wherein the dimensionally stable upholstery means is formed by the upper frame.

6. A seat according to claim 2, wherein the spring system is developed as a double lever frame, having an intermediate frame that pivots at the supporting frame against at the intermediate frame against at least one additional supporting spring, and wherein the dimensionally stable upholstery means is formed by the upper frame.

7. A seat according to claim 1, wherein the upholstered part has a molded shell and upholstery layer; flanks on said molded shell which carry a surrounding clamping channel profile in which borders of the cover means are fastened; and wherein the molded shell is connected firmly with the spring system.

8. A seat according to claim 7, wherein the surrounding clamping channel profile is molded into or onto the molded shell.

9. A seat accoridng to claim 8, wherein the spring system is developed as a coil spring core with coil springs that are fastened at the supporting frame means and project away from it at an approximately right angle, and wherein the molded shell sits on free ends of the coil springs and is directly and firmly connected with them.

10. A seat according to claim 1, wherein the upholstered part has a molded shell and an upholstered layer; the spring systme being developed as a swinging frame that pivots at the supporting frame means against at least one supporting spring; the molded shell being held at the swinging frame; and wherein the swinging frame carries a surrounding clamping channel profile in which borders of the cover means are fastened.

11. A seat according to claim 2, wherein the clamping channel profile is developed as a double clamping channel profile having upper borders of a flexible screen made of at least one of a fabric and imitation leather; said flexible seen being tensionally fastened at the supporting frame means and forming the lower portion of the cover means that absorbs spring loading forces.

12. A seat according to claim 11, wherein the supporting frame carries a surrounding clamping channel profile for lower borders of the flexible screen.

13. A seat according to claim 7, wherein the molded shell is developed to be self-supporting and the spring system is developed as a swinging frame that pivots at the supporting frame against at least one supporting spring; and wherein said swinging frame defines a supporting frame of a seat bracket and is formed by the molded shell.

14. A seat according to claim 13, wherein the connection point of the molded shell with the spring system occurs in a lower shell area; and wherein the supporting spring is developed as a tension spring means that acts upon the supporting frame on one side thereof and engages in an upper shell area of the molded shell on another side thereof.

15. A seat according to claim 1, wherein the upholstered part has an essentially dimensionally stable cushion layer with a cover stuffing the rests on it, at least in partial areas; and wherein the additional fastening means of the cover means are formed by a least one of clamps, adhesive strips, and Velcro strips, held at a border of the cushion layer at the transition area of the upholstered part.

16. A seat according to claim 1, wherein the upholstered part comprises a cushion layer having a cover stuffing that rests on it, at least in partial areas; a plastic molded shell, that reaches around the cushion layer up to close to a foamed material layer of the upholstered part; and wherein the additional fastening means of the coverf means is arranged at end edge of the molded shell at the transition area of the upholstered part.

17. A seat according to claim 15, wherein a surrounding strip means is sewn on along the connecting junction of the upper and lower portion of the cover means; and wherein the strip is fixed directly along a contact line at the upholstered part by the additional fastening means.

18. A seat according to claim 17, wherein the surrounding strip is made of plastic as an extruded profile and has a strip head, that in its cross-section is approximately circular, and a web portion integrally connected to the strip head; the cover means being sewn together with said web portion; at least one of a wire and a plastic string being held along an end of the web portion that faces away from the strip head; plural clamp means fitted through the web portion in an axial direction of the strip and at a distance from one another; and wherein clamp means reach around the at least wire and plastic string and are stapled into the cushion layer.

19. A seat according to claim 18, wherein the surrounding strip is developed as a double-eye profile with a web portion that is disposed in-between, and wherein the at least one wire and plastic string lies inside one eye.

20. A seat according to claim 17, wherein the surrounding strip is made of plastic as an extruded profile and has a strip head, that is approximately circular in its cross-section and a web portion that integrally connects to the strp head; a free end of said web portion carrying one profile part of a zipper; and wherein another profile part of the zipper being fastened to the cushion layer.

21. A seat according to claim 17, wherein the surrounding strip is made of plastic as an extruded profile has a strip head, that is approximately circular in its cross-section and a web portion that integrally connects to the strip head; a free end of said web portion carrying one part of a snap connection; and wherein another part of the snap connection is fastened to the cushion layer.

22. A seat according to claim 19, wherein a recess is provided in the cushion layer for receiving the web portion with at least one of an eye, a zipper part and a snap connection part, so that only the strip head projects at an upholstery border.

23. A seat according to claim 1, wherein the essentially dimensionally stable cushion layer has a cover stuffing that rests on it in partial areas; the additional fastening means of the cover means provides separate fastening of the upper and lower portion of the cover means on a bottom side of the cushion layer; and wherein an upper frame of the spring system rests against the bottom side of the cushion layer.

24. A seat according to claim 23, wherein the fastening of the upper portion of the cover means is formed by at least one of fastening means such as adhesive strips, Velcro-strips, and clamps.

25. A seat according to claim 23, wherein the first fastening means of the lower portion of the cover means at the dimensionally stable upholstery frame means of is formed by a clamping channel profile that is connected with the lower portion by sewing.

26. A seat according to claim 1, wherein said preload force absorbing cover means acts through the dimensionally stable means which is configured as an upholstery frame means.

27. A seat according to claim 1, wherein said preload force absorbing cover means acts through a shaped seat shell.

28. A seat according to claim 1, wherein said preload force absorbing cover means is a dimensionally stable upholstery material.

* * * * *